United States Patent

[11] 3,611,320

[72] Inventor Robert L. Williams
Richardson, Tex.
[21] Appl. No. 813,246
[22] Filed Apr. 3, 1969
[45] Patented Oct. 5, 1971
[73] Assignee Texas Instruments Incorporated
Dallas, Tex.

[54] LIGHT BEAM INFORMATION STORAGE SYSTEM
17 Claims, 3 Drawing Figs.

[52] U.S. Cl. .......... 340/173 LM, 250/208, 350/160 P, 350/DIG. 1
[51] Int. Cl. .......... G11c 11/42
[50] Field of Search .......... 340/173, 173 LM; 307/117; 250/208

[56] References Cited

UNITED STATES PATENTS

| | | | |
|---|---|---|---|
| 3,059,115 | 10/1962 | Lempickl | 340/173 L |
| 3,118,130 | 1/1964 | Rediker | 340/173 |
| 3,341,825 | 9/1967 | Schrieffer | 340/173 |

*Primary Examiner*—Terrell W. Fears
*Attorneys*—Samuel M. Mims, Jr., James O. Dixon, Andrew M. Hassell, Harold Levine, Melvin Sharp, William E. Hiller and John E. Vandigriff

ABSTRACT: Information may be stored on a light read target of a photoconductive material with a PN junction formed over one surface and read out by a scanning light beam. The light beam lowers the resistance of the localized area of the light read target upon which the beam impinges to establish a current flow from an external source to charge the photoconductive material to a level determined by the external source. Input illumination incident on the photoconductive material of the target creates a charge density pattern by photon absorption that varies in accordance with the quantity of input illumination. In a subsequent scanning of the light beam, additional current flows through the localized low-resistance areas to reestablish the original charge level. The magnitude of current flow during the recharge cycle is related to the quantity of input illumination to the target.

PATENTED OCT 5 1971 3,611,320

Figures 1, 2, 3:
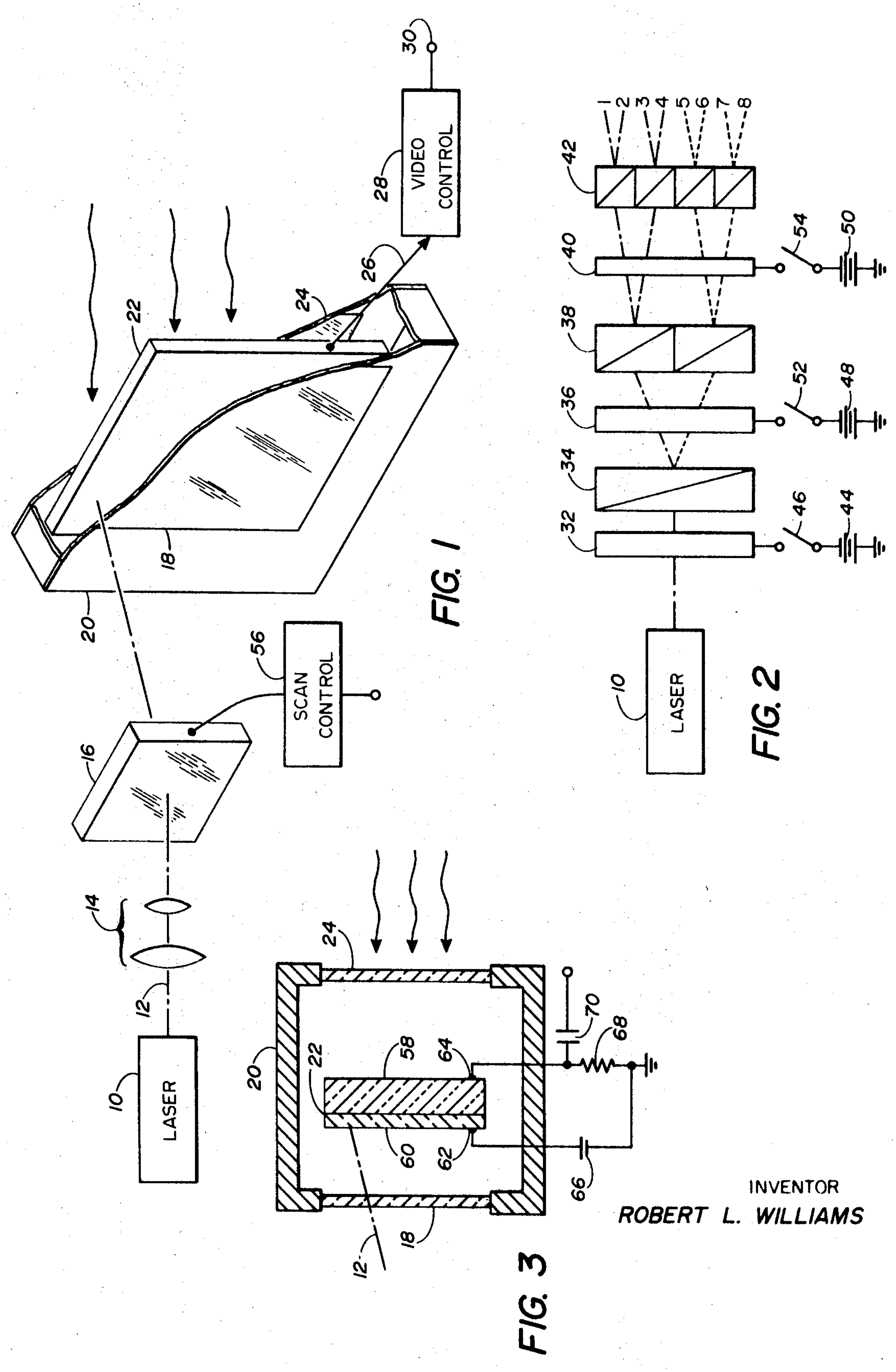

INVENTOR
ROBERT L. WILLIAMS

LIGHT BEAM INFORMATION STORAGE SYSTEM

This invention relates to information storage, and more particularly to a solid state, light sensitive, storage system utilizing a light-beam readout.

A number of different electronic cameras have been developed for television and related optical image and other data transmission systems. Of these, the vidicon tube has the inherent advantages of high sensitivity, small size, and simple mechanical construction. One type of vidicon tube utilizes a target consisting of a silicon slice into which an array of PN junction diodes has been formed. Vidicon tubes of this design utilize the array of discrete PN junctions to convert an optical image to a stored charge pattern which is periodically scanned and erased by an electron beam. The act of erasing the charge pattern with the electron beam creates a current in an external circuit that generates the video signal.

One shortcoming of vidicon tubes utilizing a target of an array of PN junction diodes and an electron beam is that both the target and the electron source must be enclosed within a highly evacuated envelope. This has caused problems in the fabrication of vidicon tubes since the bake-out required during the envelope evacuation may damage the target. Another problem with the electron-beam readout vidicon tube is that the heated filament required for producing the electron beam emits radiation which can effect the target characteristics. This last problem is particularly bothersome for those applications which require the use of an infrared-sensitive target. A PN junction target made up of an array of diodes also suffers in image resolution which will vary in direct proportion to the number of diodes in the array.

An object of this invention is to provide a high-resolution information storage system. Another object of the present invention is to provide a light-beam readout for an information storage system. Still another object of this invention is to provide an information storage system operable in an atmospheric environment A further object of this invention is to provide an information storage system having a target in a low-background environment Another object of this invention is to provide environmental control of a target in an information storage system.

In accordance with this invention, a target of a photoconductive material, such as mercury doped germanium, with a single PN junction formed at one surface has a charge density pattern that varies in accordance with the quantity of input illumination incident thereon. A readout light beam is scanned horizontally and vertically over the target to lower the resistance of localized areas of the PN junction to restore the charge density of the photoconductive material to a uniform level. The current passing through the low-resistance areas to charge the target to the uniform level is supplied by an external power source. Charging currents passing through the low-resistance areas of the target produce video signals that vary in accordance with the input illumination incident on the target.

In accordance with a specific embodiment of this invention, a target of a photoconductive material, such as mercury doped germanium, with a PN junction formed at one surface has a charge density pattern that varies in accordance with the quantity of input illumination incident thereon. A laser produces coherent radiation that is columnated into a narrow beam. This narrow beam of high-intensity light passes through an electro-optic deflector which causes the light beam to be scanned both horizontally and vertically across the target area. The scanning light beam lowers the resistance of a localized area of the PN junction. A DC current source connects to one side of the PN junction and a circuit that includes a load resistor connects to the photoconductive material side to develop a voltage related to the input illumination. The voltage across the load resistor is produced by the current passing through the localized low-resistance areas of the target.

A more complete understanding of the invention and its advantages will be apparent from the specification and claims and from the accompanying drawings illustrative of the invention.

Referring to the drawings:

FIG. 1 schematically illustrates a light-beam readout information storage system for the generation of a video signal;

FIG. 2 is a schematic of a three-stage digital light reflector for providing horizontal and vertical scanning of the light beam of FIG. 1; and FIG. 3 is a schematic of a light readout target enclosed in a target housing and connected to an external signal source.

Referring to FIG. 1, there is shown a camera for producing video signals with a light beam for readout of information stored in a light-readout target. Although the invention will be described with emphasis on the camera application, it is to be understood that other information storage applications utilizing a light-beam readout are possible. For example, in addition to a camera for producing video signals, the system of the present invention could provide information storage for a computer memory.

The system of FIG. 1 includes a solid state laser 10, such as a ruby or a PN junction, producing a monochromatic, coherent light beam 12 that passes through a beam-focusing and collimating lens system 14. From the lens system 14, there emerges a very narrow high-intensity light beam that is transmitted to a light-beam deflector 16 connected to the output of a scan control 56. The operating principles and general characteristics of various deflection methods are described in a number of periodicals and texts. Various deflection methods that may be used to scan the beam 12 are: (1) variable deflectors, (2) variable refractors, (3) birefringent deflection, and (4) interference deflection.

A light beam entering the scanner 16 emerges therefrom and is transmitted through a window 18 in a target housing 20 to be incident upon a target 22. By locating the target 22 in the housing 20, close environmental control can be maintained around the target without including the remainder of the camera system. The target 22 may be maintained in a low-background environment by constructing the window 18 of the material that filters unwanted radiation from the target. The target 22 will also be in a low-background environment by elimination of the heater in an electron gun in an electron readout system, as explained previously.

An optical image may be focused on the target 22 through a window 24 by a lens system (not shown) in the usual manner of a vidicon tube operation. This optical image causes a current flow in a line 26 to a video controller 28 to produce video signals at a terminal 30. Basically, the video controller controller 28 includes the same circuitry and operates in a manner similar to conventional vidicon tubes employing electron-beam readout.

Referring to FIG. 2, there is shown a representative system for birefringent deflection of the light beam 12 to produce horizontal and vertical scanning of the target 22. The collimated deflector shown in FIG. 2 includes three light-deflecting stages: the first stage includes an electro-optic switch 32 and a prism 34 having two wedges of a birefringent material; the second stage includes an electro-optic switch 36 and a prism 38 having four wedges of a birefringent material; and stage three includes an electro-optic switch 40 and a prism 42 having eight wedges also of a birefringent material. The electro-optic switch 32 of the first stage connects to a source of DC voltage 44 through a two-position switch 46. Similarly, the electro-optic switches 36 and 40 are connected to DC voltage supplies 48 and 50 through two-position switches 52 and 54, respectively. Binary cells of the type illustrated in FIG. 2 may be cascaded $n$ times to obtain $2^n$ distinct beam positions at the output.

In an information storage system in accordance with the present invention the two-position switches 46, 52, and 54 may take the form of solid state devices that comprise a part of the scan control 56 and operates from a video scanning signal.

A typical electro-optic switch in a digital light deflector uses the longitudinal electro-optic effect of potassium dideurtherium phosphate (KD*P) crystals (Pockels effect). These switches could also be made from (potassium-tantalum niobate) KTN, or the electrically optic glass disclosed by N. F.

Barrelli et al. in *Applied Physics*, Vol, 7, page 117 (1965). With each of these materials, it is possible to switch between two orthogonal polarization states by applying no voltage, or the half-wave voltage to the crystals. In FIG. 2, the half-wave voltage is supplied by the DC voltage sources 44, 48, and 50. The no voltage condition for the electro-optic switches 32, 36 and 40 is obtainable by merely opening the two-position switches 46, 52, and 54. By using cascaded binary cells of the type illustrated to give a two-dimensional array, resolutions of greater than $10^6$are practical with present technology. Scanning rates are determined by the switching speeds and switching rates of the individual polarization switches.

By using the birefringent deflector illustrated in FIG. 2, or any of the other light-beam deflection techniques, the beam 12 may be scanned both horizontally and vertically to cover the active area of the target 22. With the birefringent reflector illustrated, the light beam 12 from the source 10 can be made to appear at any one of eight different positions by closing the switches 46, 52, 54 in various combinations. For a complete description of the birefringent deflector illustrated in FIG. 2, reference is made to the copending patent application of Henry John Caulfield, Ser. No. 613,207, filed Feb. 1, 1967, and assigned to the assignee of the present invention.

Referring to FIG. 3, the scanning light beam 12 enters the housing 20 through the window 18 and strikes the target 22. The target is fabricated from a monolithic slice of a semiconductor photoconductive material 58, e.g. P-type silicon, having a high resistivity. At the light-beam side of the target 22, an N-type layer 60 is formed over one face of the photoconductive material to form a single PN junction active area. Ohmic contacts are made to the semiconductor material 58 and the layer 60 by suitable conventional means represented at 62 and 64. The ohmic contact 62 connects to one side of a DC supply (illustrated as a battery 66) and the ohmic contact 64 connects to a load resistor 68. A voltage drop developed across the load resistor 68 when the light beam 12 strikes the target 22 produces a video output signal at a capacitor 70, as will be hereafter described in greater detail. The battery 66, load resistor 68, and the capacitor 70 would be part of the video control 28.

Operationally, the target 22 acts as an optical image storage device during each scan-cycle of the light beam 12, which is typically the same as that used in commercial television. Visualize the light beam 12 scanning the N-type portion of the target 22. Each localized area of the target 22 subjected to the light beam 12 functions as a diode which changes from a high resistance to a low resistance when the light beam is incident thereon. Lowering the resistance of the localized areas of the PN junction causes a current to flow through the photoconductive material 58 and the layer 60 from the battery 66 through the load resistor 68. Since the layer 60 is at a potential established by the DC voltage source, the scanning action of the beam 12 will charge the photoconductive material 58 to a uniform level determined by the source voltage.

Once scanned, each area returns to its high-resistance condition and will remain so unless the depletion layer capacitance, which is a measure of the photoconductive material's charge-storing capability, is discharged by light-created holes or by diode leakage. When the light entering the housing 20 through the window 24 does create the hole carriers in the photoconductive material 58, localized areas of the target 22 are slowly discharged. Thus, the uniform charge established by operation of the scanning light beam 12 is patterned in accordance with the quantity of input illumination entering the housing 20. When the scanning light beam 12 again switches localized areas of PN junction to the low-resistance level, the discharged areas of the target 22 will be recharged to the level established by the source 66. This produces a current through the load resistor 68 proportional to the light incident on the target 22, thus producing a video output voltage through the capacitor 70.

The photoconductive material 58 is normally selected to provide the most efficient response to a particular portion of the light-energy spectrum of interest. Silicon, germanium, and gallium arsenide are of particular importance. The impurity concentration of the semiconductor should be selected to provide the longest possible storage time, i.e., the minimum dark current for most applications. Two impurities that have been used with germanium are mercury and copper. Typically, the high-resistivity photoconductive material is a P-type semiconductor with an N-type impurity diffused therein to form the PN junction. By appropriate cooling techniques, the temperature within the housing 20 may be controlled to provide optimum charge storage in the target 22. As explained previously, enclosing the target 22 in the housing 20 also enables the use of filtering windows to eliminate unwanted radiation from striking the target.

While one embodiment of the invention, together with modifications thereof, has been described in detail and shown in the accompanying drawings it will be evident that various other modifications are possible without departing from the scope of the invention.

What is claimed is:

1. An information storage system comprising:

a target of a photoconductive material with a PN junction formed over one surface and having a charge density pattern varying in accordance with the quantity of input illumination incident thereon, light means for scanning the target with a readout light beam to restore the charge density thereon to a uniform level, and circuit means including a current source connected to said target for establishing the uniform charge level in the area scanned by said light beam.

2. An information storage system as set forth in claim 1 wherein said light beam means includes a laser producing a collimated beam of coherent radiation.

3. An information storage system as set forth in claim 1 wherein said P-type is a P-type photoconductive semiconductor with an N-type layer extending over one surface to form a single PN junction.

4. An information storage system comprising:

a target of a photoconductive material with a PN junction target formed over one surface and having a charge density pattern varying in accordance with the quantity of input illumination incident thereon, a light beam directed to said target to restore the charge density thereon to a uniform level, means for scanning said light beam horizontally and vertically across the active area of said target, and circuit means including a current source connected to said target for establishing the uniform charge level in the localized area thereof subjected to the scanning light beam.

5. An information storage system as set forth in claim 4 wherein said scanning means includes an electro-optic light deflector disposed in the path of said light beam.

6. An information storage system as set forth in claim 5 including means for collimating said light beam prior to entering said electro-optic light deflector to produce a narrow readout light beam to scan the target for improved information retrieval resolution.

7. An information storage system as set forth in claim 6 wherein said target is a P-type photoconductive semiconductor with an N-type layer extending over one surface to form a single PN junction.

8. An information storage system comprising:

a target of a photoconductive material with a PN junction target formed over one surface and having a charge density pattern varying in accordance with the quantity of illumination incident thereon, a target housing enclosing said target for maintaining the target under preferred environmental conditions, said housing including windows on opposite sides of said target, a light beam directed to said target through one window of said housing to restore the charge density thereon to a uniform level, means for scanning said light beam in a horizontal an vertical direction prior to entering said housing, and circuit means including a current source connected to said target for establishing the uniform charge level in the localized areas thereof subjected to the scanning light beam.

9. An information storage system as set forth in claim 8 wherein the scanning light beam changes localized areas of the PN junction from a high resistance to a low resistance to permit current flow through said target to establish the uniform charge level.

10. An information storage system as set forth in claim 8 wherein the window in said housing through which said light beams enters includes a filter for blocking all but selected wavelengths of energy radiation.

11. An information storage system as set forth in claim 10 including a beam collimator disposed in said light beam prior to being deflected by said scanning means to produce a narrow collimated readout light beam incident on the target to improve resolution of information retrieval.

12. An information storage system as set forth in claim 11 wherein said scanning means includes as electro-optic deflector disposed in the path of said light beam after said beam collimator and before entering said housing.

13. An information storage system as set forth in claim 8 wherein said target is a P-type photoconductive semiconductor with an N-type layer extending over one surface to form a single PN junction.

14. An information storage system as set forth in claim 13 wherein said photoconductive semiconductor is mercury doped germanium.

15. An information storage system as set forth in claim 13 wherein said photoconductive semiconductor is a copper doped germanium.

16. An information storage system comprising:

a. a target of photoconductive material with a PN junction formed over one surface and having a charge density pattern varying in accordance with the quantity of input illumination incident thereon;

B. a target housing for enclosing said target including a window; and c. light means for scanning said target through said window with a readout light beam to lower the resistance at localized areas of said PN junction and thereby restore the charge density on said target to a uniform level.

17. The system of claim 16 including circuit means having a current source connected to said target for establishing a uniform charge level in the area scanned by said light beam.